United States Patent Office 2,816,883
Patented Dec. 17, 1957

2,816,883

PRODUCT AND PROCESS OF POLYMERIZING ETHYLENE

Arthur W. Larchar, Mendenhall, Pa., and Donald C. Pease, Wilmington, Del., assignors to E. I. du Pont de Nemours & Company, Wilmington, Del., a corporation of Delaware No Drawing. Application August 2, 1951, Serial No. 240,044

6 Claims. (Cl. 260—94.9)

This invention relates to new macromolecular polymers of ethylene and to methods for their preparation. The application is a continuation-in-part of copending application, S. N. 739,264, filed April 3, 1947, now abandoned. Subject matter described and claimed herein was disclosed in applicants' copending continuation application, Serial Number 563,699, filed February 6, 1956, and now abandoned.

It is known that when ethylene is subjected to pressures in the range of 500 to 3000 atmospheres, at temperatures of 100° to 300° C., it polymerizes to products ranging from oily liquids to wax-like solids. As generally produced, the wax-like solids melt in the range of 100° to 120° C., have an average density of 0.925, an elongation at break of 550 to 700%, a tensile strength on final cross-section of 16,000 lbs./in.$^2$, a stiffness modulus in the range of 16,000 to 21,000 lb./in.$^2$, an amorphous content of the order of 22%, a degree of chain branching corresponding to about one side chain per 20 carbon atoms in the chain, and an inherent viscosity of 0.92 measured at 0.125% concentration in xylene at 85° C. Although this represents a remarkable combination of properties, for many industrial uses they fall short of meeting even minimum requirements.

It is also known that in the presence of specific catalysts, and under certain conditions of temperature and pressure, carbon monoxide and hydrogen react to give methanol and branched chain higher alcohols (U. S. Patent 1,770,165). It is also well known that under certain other conditions involving the use of certain cobalt-containing or ruthenium-containing catalysts, the reaction between carbon monoxide and hydrogen leads to the formation of paraffin waxes (Fischer et al., Brennstoff-Chemie 19, 226–30 (1938); ibid, 20, 247–50 (1939); cf. also Brit. 468,434).

High molecular weight straight chain alcohols and other oxygen-containing organic compounds have also been obtained by hydrogenation of carbon monoxide in the presence of metals of the eighth group suspended in paraffin hydrocarbons ("Patent Applications in the Field of Fischer-Tropsch and Allied Reactions," vol. II, 1948, translated by Charles A. Meyer & Co., containing the following German patent applications of the I. G.: R–106,854 IVD/12o, January, 1940; O. Z. 14,718 J/Z, April 25, 1944; O. Z. 14,225, January 8, 1943; O. Z. 14,226, June 8, 1943; O. Z. 12,880, July 5, 1941). In general, the waxes previously obtained were produced simultaneously with compounds of relatively low molecular weight (Fischer and Pichler, Brennstoff Chemie 20, 247–50 (1939)), the average molecular weight of the products being generally less than 1000. These previously known waxy reaction products contained ingredients which could be distilled at high temperatures and low pressures (200° C./2 mm.).

An object of this invention is to provide a process for the production of new compositions of matter. Another object is to provide a new polymer of ethylene having properties superior with respect to elongation and stiffness resulting, inter alia, from molecular structure and crystallinity. Other objects and advantages will hereinafter appear.

This invention provides new ethylene polymers possessing a combination of properties unattained in any hitherto known ethylene polymer. These ethylene polymers melt in the range of 127° to 132° C., have a stiffness modulus of from 137,000 to 215,000 lbs./in.$^2$, a breaking strength, based on the drawn dimensions, of 40,000 to 55,000 lb./in.$^2$, an elongation at break of 1200 to 1300%, a relative viscosity of from 1.0 to 1.5, measured at 0.125% concentration in xylene at 85° C., a degree of chain branching corresponding to less than one side chain per 200 carbon atoms in the main polymer chain, and an amorphous content of not more than 10%.

The novel ethylene polymers of this invention are made by subjecting ethylene to pressures of from about 5,000 to 20,000 atmospheres at temperatures above 45° C. but below 200° C., preferably in the presence of a material which yields reactive free radicals under the conditions of reaction.

In a preferred method for preparing the novel ethylene polymers of this invention, a pressure reactor is charged with a solvent, such as an aromatic, cycloaliphatic, or paraffinic hydrocarbon, or an alcohol, and from 0.01 to 1%, based on the charge, of a substance which yields reactive free radicals under the conditions of reaction, such as an organic peroxy compound or azonitrile, the reactor is connected to a source of ethylene and pressured to the selected pressure with ethylene. The reactor is then closed and heated to between 45 and 200° C., preferably to between 40 and 100° C., and the pressure within the reactor maintained by further compression. After the desired degree of reaction has been attained, the reactor is allowed to cool to room temperature, opened, and the contents discharged. The polymer is then isolated by conventional methods. The polymers produced in accordance with the process of this invention have melting points ranging from 127° to 132° C.

Melting point is determined under a microscope having a micro-heating stage provided with controlled means for heating films of polymer of about 100–300 microns in thickness to the fusion temperature. The melting point is taken as the temperature at which there is disappearance of double refraction.

The examples which follow are submitted to illustrate and not to limit this invention.

*Example 1.*—Eighty-nine parts of benzene, 0.425 part of 2,2'-azobis-2,4-dimethylvaleronitrile, and 78 parts of ethylene are charged into a pressure vessel capable of withstanding internal pressures of at least 1000 atm. One end of the vessel is fitted with a needle valve for admitting compressed ethylene, for example, at 1000 atm., and the other end is fitted with a removable closure which makes a tight seal when subjected to an internal pressure of several hundred pounds per sq. in. in excess of the external pressure, but which, when subjected to an external pressure in excess of the internal pressure, transmits the higher pressure to the contents of the vessel. The closure consists of a piston having a diameter slightly less than the bore of the vessel, attached to a shank of considerably smaller diameter. When subjected to internal pressure only, the piston is supported by a ring of compressible packing backed by a packing gland. The shank is unsupported and extends through a hole in the gland. This vessel, containing the reaction mixture previously described, is placed in a larger, heavy walled, heated cylinder containing 90% glycerine as a pressure transmitting fluid. Pressure is built up in this cylinder by means of a hydraulic intensifier and is maintained at 6500–7300 atm. for a period of 66 hours, during which time the temperature is held at 45° C. After release of pressure and removal of benzene 11.8 parts of polymer is obtained. This polymer has a melting point of 130.3° C. and a density (annealed) of 0.956.

*Example 2.*—Eighty six parts of benzene, 79 parts of ethylene, and 0.48 part of 1,1'-azodicyclohexanecarbonitrile are held for 68 hours at 7300 atm. and 80° C. in the equipment described in Example 1. The product is dissolved in hot xylene, the solution filtered, and the polymer recovered from the filtrate by precipitating with methanol, filtering, and drying. Forty three parts of polymer are recovered. This material has a density (annealed) of 0.970 and a melting point of 127.60 C. The same catalyst at 100 atm. pressure gives a polymer melting at 122.4° C.

*Example 3.*—Eighty six parts of benzene, 84 parts of ethylene, and 0.44 part of ditertiary butyl perphthalate are charged into the apparatus described under Example 1 and maintained at 7300 atm. and 85° C. for 19 hours. The polymer is dissolved in hot xylene, the solution filtered, and precipitated with methanol. Nineteen parts of polymer is obtained after filtration and drying. Its melting point is 128.0° C., as compared with 120.3° C. for ethylene polymer obtained with the same catalyst at 1000 atm.

*Example 4.*—Seventy five parts of tert.-butanol, 90 parts of ethylene, and 0.2 part of alpha,alpha'-azodiisobutyronitrile are held for 17 hours at 60° C., under a pressure of 6700–7300 atm. in the apparatus described under Example 1. Seventy parts of polymer are obtained. This polymer has a melting point of 131.0° C., a relative viscosity of 1.15, measured at 0.125% concentration in xylene at 85° C.

*Example 5.*—The apparatus described in Example 1 is used with a reaction mixture consisting of 79 parts of absolute ethanol, 84 parts of ethylene and 0.2 part of alpha,-alpha'-azodiisobutyronitrile. The pressure is held at 6900–7300 atm. for a period of 18 hours, with water as the pressure transmitting medium. The temperature is 60° C. Fifty four parts of polymer are recovered by precipitating a hot xylene solution of the reaction product with methanol. This polymer melts at 132.1° C. and has a density (annealed) of 0.954. A film of the polymer obtained by moulding at a temperature above the melting point has an elongation at break of 1202% and a tensile strength, based on final dimensions, of 54,700 lb./sq.in. The relative viscosity is 1.14, measured at 0.125% concentration in xylene at 85° C.

*Example 6.*—Sixty seven parts of isooctane, 81 parts of ethylene, and 0.2 part of alpha,alpha'-azodiisobutyronitrile are subjected to a pressure of 6900–7300 atm. for 20 hours at 60° C. The polymer, 55 parts of which is recovered in the same manner described in the preceding example, has a melting point of 127.4° C.

*Example 7.*—The apparatus employed in the preceding examples is used to hold 82 parts of methanol, 90 parts of ethylene, and 0.2 part of benzoyl peroxide under a pressure of 6700–7300 atm. for 19 hours. The temperature is maintained at 80° C. Twenty five parts of polymer, having a melting point of 130.0° C., is recovered by the procedure outlined in Example 2.

*Example 8.*—In this example and in those which follow, a heavy walled, externally heated steel cylinder serves both as a compression and reaction chamber. One end of the cylinder is fitted with a closure retaining high internal pressures; the other with a packed plunger which is forced into the bore of the cylinder by means of a second piston of larger cross section. The second piston is hydraulically actuated. A small radial hole through the cylinder wall near the piston end is used to admit compressed ethylene to the chamber when the piston position is at the start of the compression stroke. In operation, the high pressure piston is locked in this position after charging with the reaction medium and catalyst; and the chamber is filled with ethylene at 1000 atm. The reaction mixture is then compressed by forcing the plunger into the chamber, the gas inlet port being sealed off by the advancing plunger. Two hundred fifty-eight parts of benzene, 1.25 parts of alpha,alpha'-azo-diisobutyronitrile and 300 parts of ethylene are compressed to 7400 atm. in the apparatus described above and the cylinder heated to 60° C. As the pressure drops, due to polymerization of the ethylene, it is periodically raised to 7400 atm. by advancing the piston. The pressure range during the 19 hour reaction period is 5750 to 7400 atm. Seventy-nine parts of polymer is recovered by the procedure employed in Example 2.

The polymer melts at 129.8° C. and has a density (annealed) of 0.955. The relative viscosity of a 0.125% solution in xylene at 85° C. is 1.127. A film obtained by pressing the polymer between plates heated to 140° C. is exceptionally stiff, having a modulus of 145,000 lb./sq. in. Its tensile strength on initial dimensions is 2920 lb./sq. in., on final dimensions 40,000 lb./sq. in., and its elongation at break is 1240%.

The intensity of the infra-red absorption at 11.3$\mu$ indicates that side chains are present in the polymer at a frequency of less than 1 side chain per 200 carbon atoms in the main chain and hence that the polymer is highly linear in structure. An absence of absorption at 5.7$\mu$ indicate freedom from carbonyl groups.

Polymer made in benzene in the same equipment and with the same initiator but at a pressure of 900–1000 atm. has a melting point of 121.8° C.

*Example 9.*—Two hundred fifty-eight parts of benzene, 1.25 parts of alpha,alpha'-azodiisobutyronitrile, and 300 parts of ethylene are compressed to 11,000 atm. in the apparatus described in Example 8 and held at 60° C. for 4 hours. The pressure during this period ranged from 10,200 to 11,000 atm. Sixty parts of polymer melting at 129.4° C. is obtained.

*Example 10.*—Eighty-six parts of benzene, 10 parts of water, 0.3 part of alpha,alpha'-azodiisobutyronitrile, and 400 parts of ethylene are subjected to a pressure of 7680 atm. in the apparatus described under Example 8. The temperature is 60° C. and the pressure range over the 21 hour reaction period is 5700–7680 atm. One hundred and seventy-five parts of polymer melting at 130.6° C. is obtained. A film pressed from the polymer between heated plates has a stiffness modulus of 137,000 lb./sq. in., a tensile strength of 4400 lb./sq. in. based on original dimensions.

*Example 11.*—Two hundred parts of absolute ethanol, 100 parts of water, 0.3 part of alpha,alpha'-azodiisobutyronitrile, and 300 parts of ethylene are compressed to 7880 atm. and heated to 60° C. in the apparatus described under Example 8. The pressure is held between 5040 and 7880 atm. for 21 hours. One hundred forty parts of polymer melting at 129.8° C. is obtained. A very strong film is obtained by pressing the polymer between heated plates. Its tensile strength, based on original dimensions, is 11,800 lb./sq. in. and its stiffness modulus is 215,000 lb./sq. in.

*Example 12.*—One hundred seventy two parts of benzene, 400 parts of ethylene, and 0.30 part of di(tertiary butyl) peroxide are charged into the apparatus described in Example 8, and maintained at 6800 to 7700 atmospheres pressure and 122° C. for 18 hours. Twenty-nine parts of polymer melting at 128.8° C. are obtained.

X-ray data indicate that ethylene polymers obtained under pressures of the order of 7000 atmospheres are highly crystalline, having amorphous contents, when measured by the method of Mathews et al. Acta Crystallographica 2, 85 (1949), varying between 6 and 10%.

In place of the catalysts used in the examples, there may be used any material which yields reactive free radicals under the conditions of reaction. Examples are azonitriles of the type disclosed and claimed in U. S. Patent 2,471,959, organic peroxides, amine oxides, hydrazines, hydrazinium compounds and the like.

As a rule, the process is operated in the presence of a solvent or diluent but this is only optional, as the process can be carried out in the absence of such solvent or diluent, provided provision is made for rapid dissipation of the high heat of reaction. Batch operations are preferably conducted with good agitation to prevent non-uniformity of heat removal and to insure uniformity of product quality. Although the examples describe batch operations, the process of the invention can be carried out as a continuous operation. When so conducted, improved results can be obtained by taking a comparatively low yield per pass and by recycling the unconverted ethylene.

The most generally used pressures are in the range of 5,000 to 15,000 atm.; this embodies the preferred operating pressure conditions.

The polymers of this invention have a higher degree of linearity than any hitherto known ethylene polymers. This fundamental property is reflected in a higher melting point, higher density, greater crystallinity, and greater stiffness. These polymers are freer from chain branching and have a lower amorphous content than hitherto known ethylene polymers. These unique and distinguishing properties set these polymers aside from any hitherto known hydrocarbon polymers and are responsible for their extraordinarily high tensile strength, stiffness modulus, and elongation characteristics.

We claim:

1. Solid polyethylene, exceptionally stiff, having an amorphous content of not more than 10%, containing side chains, at a frequency of less than 1 side chain per 200 carbon atoms in the main chain as determined by infra-red absorption analysis, having a melting point above 127° C., a tensile strength, based on original dimensions, between about 2900 and about 11,800 pounds per square inch, a relative viscosity above 1.0 and up to about 1.5 measured at 0.125% concentration in xylene at 85° C., and a density (annealed) in the range of 0.95 to 0.97.

2. Solid polyethylene, exceptionally stiff, having an amorphous content of not more than 10%, containing side chains, at a frequency of less than 1 side chain per 200 carbon atoms in the main chain as determined by infra-red absorption analysis, having a melting point above 127° C., a relative viscosity between 1.127 and about 1.5 measured at 0.125% concentration in xylene at 85° C., and a density (annealed) in the range of 0.95 to 0.97.

3. In a process for the preparation of solid homopolymers of ethylene, the step which comprises conducting the polymerization at a pressure in the range of 5,000 to 20,000 atmospheres and a temperature between 45° C. and 200° C. in the presence of a catalyst selected from the group of azo compounds, peroxides, amine oxides, hydrazines, and hydrazinium compounds.

4. In the polymerization of ethylene to solid homopolymers at 45° C. to 100° C. in the presence of catalysts effective therefor, the step which comprises effecting said polymerization at a pressure between 5,000 and 20,000 atmospheres.

5. In a process for the preparation of solid homopolymers of ethylene, the step which comprises conducting the polymerization at a pressure of about 7,000 atmospheres, at a temperature between 45° and 85° C. and in the presence of a catalyst selected from the group consisting of 2,2'-azobis-2,4-dimethylvaleronitrile; 1,1'-azodicyclohexanecarbonitrile and alpha,alpha'-azodiisobutyronitrile.

6. In a process for the preparation of solid homopolymers of ethylene, the step which comprises conducting the polymerization at a pressure between 5,000 and 20,000 atmospheres and at a temperature between 45° C. and 200° C. in the presence of free radical generating polymerization catalysts selected from the group consisting of 2,2'-azobis-2,4-dimethylvaleronitrile; 1,1'-azodicyclohexanecarbonitrile and alpha,alpha'-azodiisobutyronitrile.

References Cited in the file of this patent

UNITED STATES PATENTS

| 1,952,116 | Bridgman et al. | Mar. 27, 1934 |
| 2,153,553 | Fawcett et al. | Apr. 11, 1939 |
| 2,352,328 | Kleine | June 27, 1944 |

OTHER REFERENCES

Cross et al.: Discussions Faraday Soc., No. 9, 235–45 (1950).
Richards: Plastics, pp. 288–289 (Oct.-Nov.-Dec. 1950).
Bryant: J. Polym. Sci., 6, 547, 550, 555 (1951).
Richards: J. Appl. Chem. 1, August 1951, pp. 370–376.
Gourlay et al.: "British Plastics," vol. 29, pp. 446–451 (1956).

UNITED STATES PATENT OFFICE

CERTIFICATE OF CORRECTION

Patent No. 2,816,883                                 December 17, 1957

Arthur W. Larchar et al.

It is hereby certified that error appears in the printed specification of the above numbered patent requiring correction and that the said Letters Patent should read as corrected below.

Column 3, line 11, for "127.60 C." read --127.6° C.--; line 12, for "100 atm." read --1000 atm.--.

Signed and sealed this 18th day of February 1958.

(SEAL)
Attest:
KARL H. AXLINE

Attesting Officer

ROBERT C. WATSON
Commissioner of Patents